3,536,452
MULTIPLE REACTOR APPARATUS
Charles J. Norton and Robert D. Holly, Denver, Colo.,
assignors to Marathon Oil Company, Findlay, Ohio, a
corporation of Ohio
Continuation-in-part of application Ser. No. 243,342,
Dec. 10, 1962. This application Apr. 21, 1965, Ser.
No. 451,687
Int. Cl. B01l 1/00, 7/00; G01n 31/00
U.S. Cl. 23—259                                              4 Claims

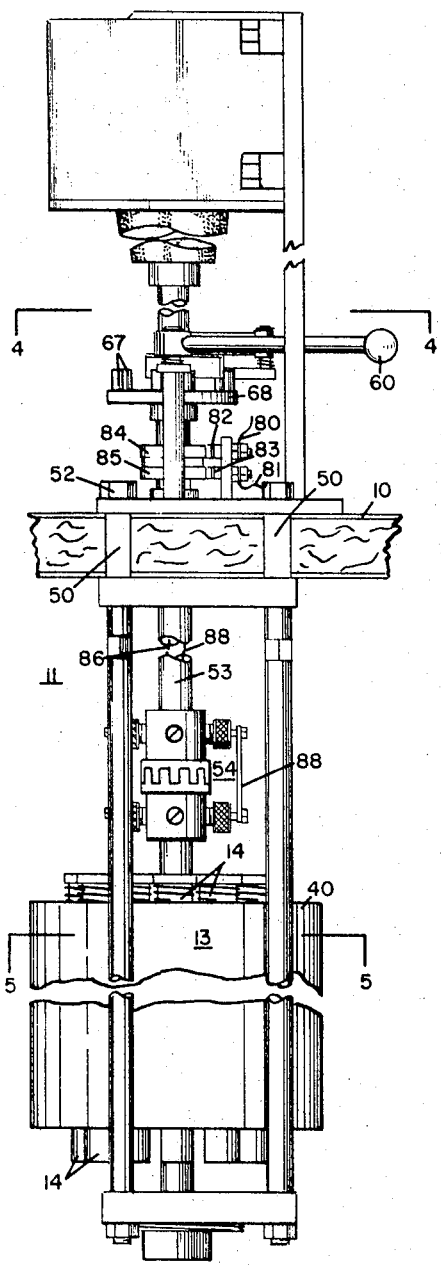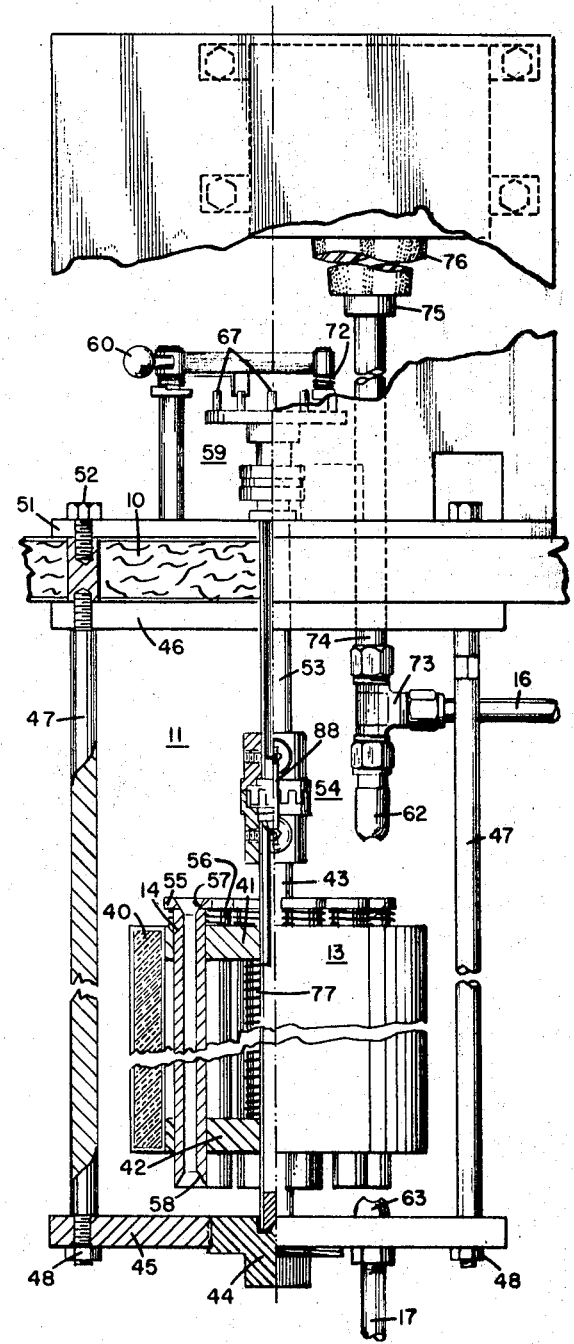
Fig. 2
Fig. 3
INVENTORS
CHARLES J. NORTON
ROBERT D. HOLLY
BY
ATTORNEYS

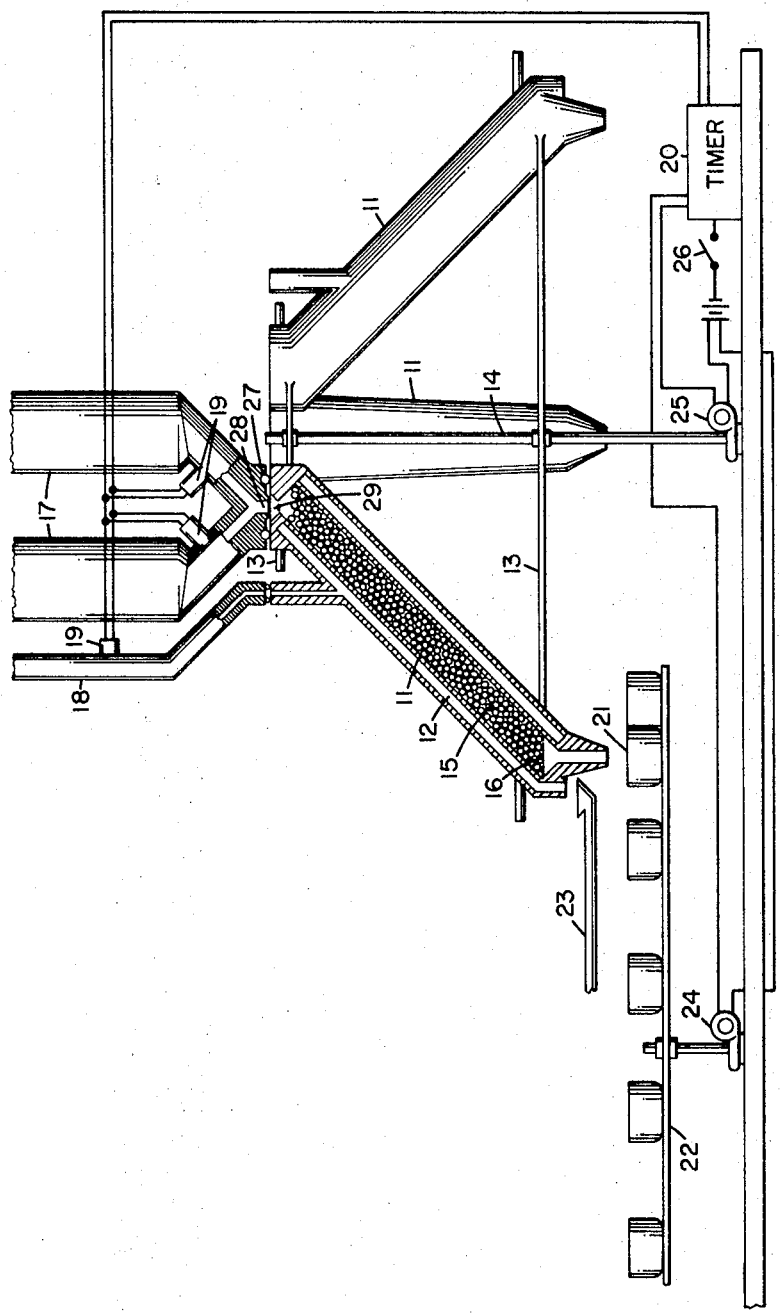

ABSTRACT OF THE DISCLOSURE

Reactor apparatus, e.g. for determining or comparing physical or chemical properties of materials or processes. A number of reactor tubes are mounted in a circle about a central longitudinal axis so that each tube may be sequentially connected with an input reactant line for effecting the desired reaction.

---

This application is a continuation-in-part of our co-pending U.S. patent application Ser. No. 243,342, filed Dec. 10, 1962 and now abandoned.

This invention relates to reactors for facilitating the study of the physical and chemical properties of materials and particularly to an apparatus for comparing a plurality of materials or reactions.

Studies are conducted in the laboratory to determine or compare physical or chemical properties of materials or to compare processes. Much time is involved in performing such tests and includes the time necessary for setting up the apparatus, testing for leaks, and attaining equilibrium temperatures. Possible variations of conditions for one test in a series to another test therein may throw doubt upon the validity of data in regard to a series of samples being compared. Accordingly, the present invention provides a reactor suitable for use in laboratory or other small scale operations requiring comparing a series of materials or processes.

Briefly, a plurality of reactor tubes are mounted in a circle about a central longitudinal axis. The tubes can be mounted vertically, at a lesser angle or horizontally. The tubes can be mounted in disks or end plates and can be surrounded by an insulating enclosure or can be individually heated. Each tube may be sequentially connected with an input reactant line for effecting the required reaction. The multiple tube reactor can then be employed with a conventional chromatographic apparatus or other reactant product receiving device.

The invention can be better understood by reference to the following description taken in connection with the accompanying drawings in which:

FIG. 2 is a side elevation view partly broken away of a reactor embodying the invention;

FIG. 3 is a front elevation view partly in section and partly broken away of the reactor of FIG. 2;

FIG. 6 is a partially cutaway, partially schematic view of a reactor assembly for use with nongaseous fluids.

Figure 1:
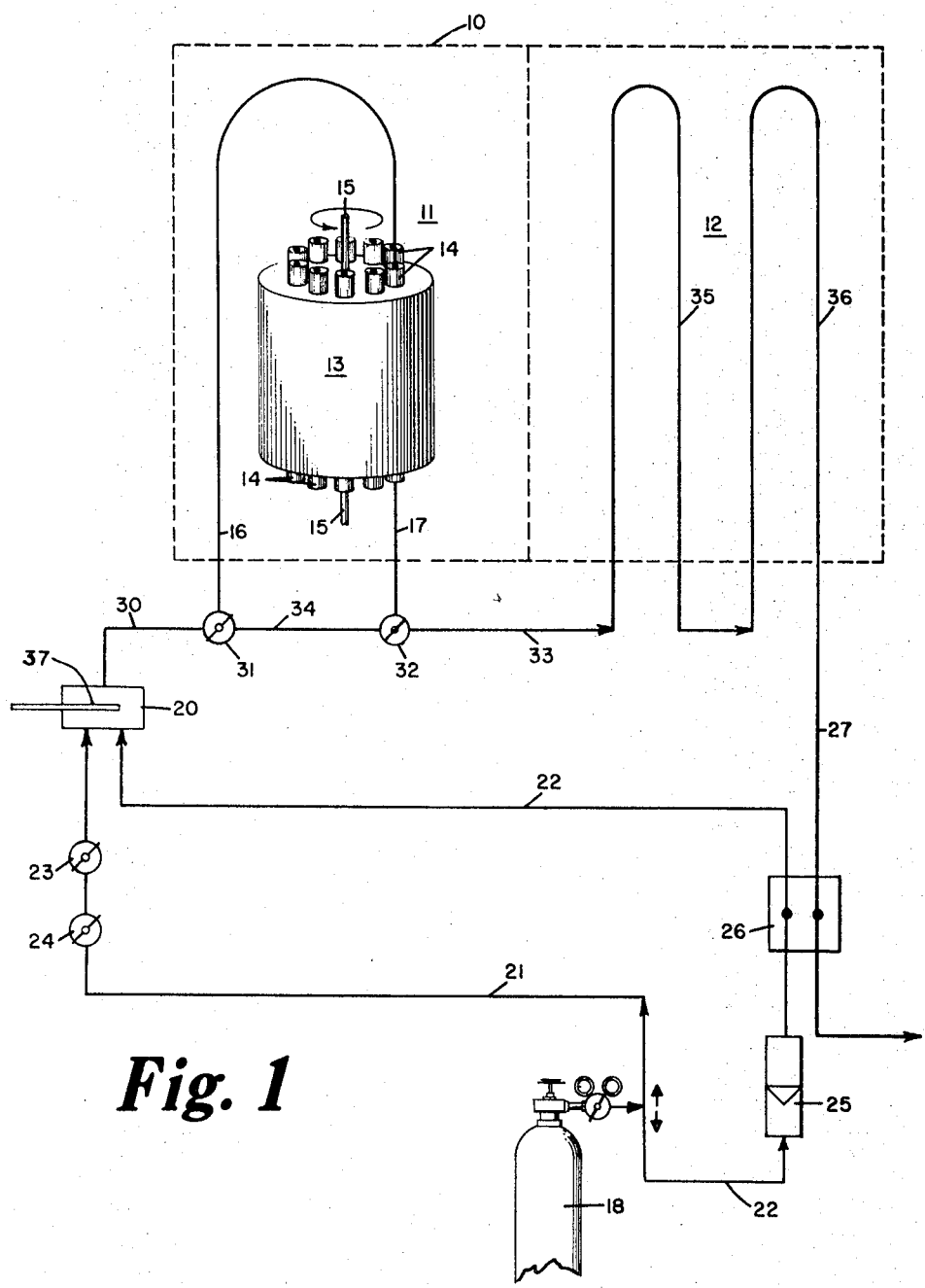
FIG. 1 is a diagrammatic view of a chromatographic system provided with a reactor embodying the invention.

Referring now to the drawings, the chromatographic system of FIG. 1 comprises an oven assembly indicated by a dotted rectangle 10 divided into a reactor oven 11 and an analysis column oven 12. Reactor assembly 13, mounted in oven 11, has a number of reactor tubes 14 arranged around shaft 15. Reactor 13 is constructed so that each tube 14 may be connected in turn between the gas inlet and outlet conduits indicated at 16 and 17, respectively.

A suitable carrier gas or reactant atmosphere is supplied to the system from cylinder 18 connected to sample injection block 20 by lines 21 and 22. Flow control valves 23 and 24 are provided in line 21, and flow meter 25 is provided in line 22. Line 22 passes through detector 26 so that the gas from the cylinder may be compared with that flowing from analysis column 12 through discharge line 27. Gas from sample injector 20 is discharged through line 30 and flows through valve 31 to conduit 16, then through one of tubes 14 to conduit 17 and out through valve 32 to line 33. By shifting the positions of valves 31 and 32, the gas from line 30 may be bypassed around the reactor tubes through line 34 between valves 31 and 32. Thus, the carrier gas may be analyzed directly by passage through analysis columns 35 and 36 in oven 12 and out to detector 26.

When a sample drop of liquid is to be injected by device 20, it is placed in injection tube 37 and is thereafter blown out by a differential pressure maintained between line 21 and 22, line 21 being regulated to maintain a slightly higher pressure, say 4 pounds greater than that of line 22. The sample drop of liquid is placed in the right end of tube 37 and is blown out by gas entering a small opening (not shown) in the tube facing the outlet of line 21. The outer end of tube 37 is sealed and the tube is removably sealed in the walls of injector 20. The drop of liquid thus forced out of tube 37 is blown into the conduit 30 with the gas and so is carried either through reactor tube 14 or bypassed directly to columns 35 or 36.

The details of construction of reactor assembly 13 and its mechanical controls are shown in FIGS. 2 and 3. Assembly 13 comprises an insulated wall 40 having top and bottom insulated end walls 41 and 42, respectively. This assembly is rotatably mounted on hollow shaft 43 which is journaled in bottom thrust bearing assembly 44 in supporting plate 45.

Plate 45 is suspended from supporting plate 46 by four corner rods 47 threaded into plate 46 and into plate 45 and secured by nuts 48 below plate 45. The upper ends of the threaded portions of rods 47 and secured to spacers 50 which extend through the top wall of oven 10 and are securely attached to supporting top plate 51 by machine screws 52. Rotatable shaft 43 is connected to a similar shaft 53 which passes through the wall of oven 10, the shafts being secured together by detachable coupling 54.

Equally spaced tubes 14 extend through and are longitudinally slidable in plates 41 and 42. Each of tubes 14 is provided with an upper flange 55 and a spring 56 for biasing it to an upper position as shown in the drawings. Each tube is open at both ends and provided with an upper conical surface 57 and a lower conical surface 58, both precision ground and preferably hardened, to facilitate the connection of the tube in the gas flow circuit.

The positions of tubes 14 may be shifted by operation of selector mechanism 59 mounted on top of supporting plate 51 and provided with an actuating knob or handle 60 to rotate assembly 13 to connect a selected one of tubes 14 between top and bottom terminal fittings 62 and 63 are spherical and accurately fit within conical openings 57 and 58, respectively, of each of tubes 14 and, when pressed into position, provide a tight gas seal.

Figure 4:
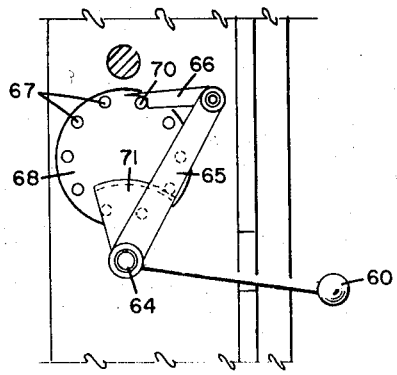
FIG. 4 is a plan view of a portion of the reactor of FIGS. 2 and 3 taken along the line 4—4 of FIG. 2.
Figure 5:
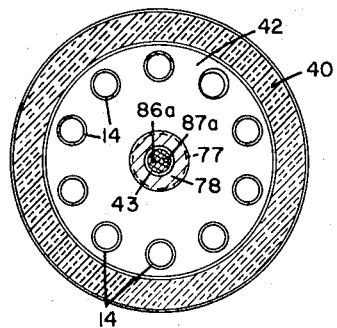
FIG. 5 is a sectional plan view taken along the line 5—5 of FIG. 2.

As shown in FIG. 4, handle 60 of the tube selector mechanism is pivoted about an axis 64 and has an arm 65 rigidly attached to it so that this arm rotates angularly when handle 60 is moved about is pivot. Arm 65 carries a pivoted selector finger 66 which is spring biased toward a circle of posts 67 each corresponding to a respective one of tubes 14. Posts 67 are mounted on disk 68 which is mounted at the top of shaft 53 to rotate therewith. As shown in FIG. 4, finger 66 is provided with a notch or grip 70 for engaging one of posts 67.

When handle 60 is rotated in a counterclockwise direction as viewed in FIG. 4, arm 66 rotates disk 68 in a counterclockwise direction and on rotation also moves with it sector member 71 which on further passes between the next two posts 67 as the disk moves and acts as a stop for the second post thereby stopping the disk after movement of the space between two of the posts. Each upward movement of the handle as viewed in FIG. 4 thus advances the disk the angular distance between two of the posts and places the tubes successively in position in alignment with terminals 62 and 63. After each forward operation, the handle is released and is returned by spring 72 to its original position.

The gas supply terminal 62, which is connected to the end of supply tube 16 by T fitting 73 as shown in FIG. 3, is mounted on the lower end of rod 74 which is secured to piston 75 of air cylinder 76. When the selected tube is in position between connectors 62 and 63, air is supplied to cylinder 76 through a control (not shown), the air pressure moves rod 75 and terminal 62 downwardly until the terminal engages a selected tube 14 and then presses this tube downwardly until the lower end of the tube engages terminal 63. The continued air pressure then provides the required seal between seats 57 and 58 of the tube and terminals 62 and 63, respectively.

Assembly 13 is regulated at a desired temperature by electric heater 77 mounted on ceramic cylinder 78 which surrounds tube 43 within assembly 13 and a thermostat (not shown). Energy for heating coil 77 is supplied through conductors 80 and 81 connected through brushes 82 and 83 and slip rings 84 and 85, respectively, to leads 86 and 87 which extend downwardly through hollow shaft 53 and are connected to similar leads 86a and 87a within the hollow shaft 43 connected to the terminals of coil 77. The eelctrical connections around coupling 54 are made by detachable conductors or straps, one of which is shown at 88.

The manual controls for actuating terminal connectors 62 and 63 to connect the selected tube in the gas flow line and the controls for turning the tubes to selected positions are all outside the walls of oven 10 where they are readily accessible. The oven may be maintained at any suitable desired temperature. The combination of oven temperature control and reactor assembly 13 temperature control insures that all of the tubes are maintained at a selected temperature.

During the operation of the system, one of the tubes may be employed to contain the sensing element, such as thermocouple. Other tubes are provided with samples under study and preferably are provided with a porous retaining plug and a small piece of stainless steel gauze to hold the samples within the tube. Tubes not in use are preferably plugged with glass wool in order to prevent the passage of convection currents of gas through tubes. The various samples in the tubes may be compared with a standard sample mounted in one of the tubes and the sets of samples may be tested at different temperatures throughout a predetermined range. A large number of tests may be made without removing the samples from assembly 13, and without opening the assembly or the oven in which it is mounted. Therefore, much time is saved in the making of multiple tests.

A satisfactory reactor constructed in the configuration of FIGS. 3 and 4 was provided with tubes 14 of 12⅛ in. x ½ in. O.D. and 0.156 in. I.D. Each tube was fitted with a ⅛ in. flange corresponding to flange 55 in the drawings. The ends of the tubes were conically flared to provide surfaces 57 and 58, the angle between the sides of the cone being 60°.

Ten such tubes were mounted in holes in the end plates having diameters about .005 in. greater than the outside diameter of the tubes to provide sliding fits. The mounting plates were ½ in. thick and were spaced 9¼ in. apart. The diameter of the chamber within assembly 13 was approximately 3½ in. and the heating tubes were mounted on a hollow cylindrical ceramic core extending between the plates and having an external diameter of approximately 1.2 in. Connectors 62 and 63 had spherical seats ground to a radius of ¼ in. and were provided with a central gas passage having a diameter of .172 in.

A second embodiment of our invention is depicted in FIG. 6. A plurality of reaction chambers 11, surrounded by cooling water jackets 12, are affixed to cross braces 13 of rack 14. Reaction chambers 11 are filled with various types of packing 15 (beads being shown) for a test of packing efficiency. Packing 15 is held in place by screens 16. Reactants—for example, ammonia and nitric acid— are contained in reservoirs 17. Coolant is introduced into jacket 12 via line 18. Fluid flow is controlled by solenoid switches 19 activated by timer 20. Reaction products— for example, ammonium nitrate—drop into container 21 on rotatable container support 22; waste coolant passes into coolant recovery line 23. Container support 22 and rack 14 are rotated by gear drive from motors 24 and 25, respectively. Motors 25 are, in turn, controlled by timer 20.

In operation, the closure of switch 26 activates timer 20 which energizes motors 24 and 25, rotating support 22 and rack 14 to a desired position wherein reaction chamber 11 is placed above positioned container 21. The timer then initiates the flow of reactants from reservoir 17 and coolant from line 18. After the passage of a desired time interval, timer 20 switches off solenoid valves 19 and, after further delay, rotates support 22 and rack 14 until the next reaction chamber 11 and container 21 are aligned. Motors 24 and 25 can be appropriately braked to prevent the rotation of support 22 and rack 14 in the absence of an electrical current from timer 20. A seal 27 between reactant injector 28 and reactor inlet 29 is provided by O-rings which are affixed to injector 28.

Other embodiments are at once obvious. For example, a system having no seals 27 can be utilized where nongaseous reactants are utilized.

Now having described our invention, what we claim is:

1. A reactor apparatus comprising a single fixed reaction station having reactant supply means and reaction products receiving means; a plurality of reaction chambers having an upper opening adapted to receive reactants and a lower opening through which reaction products exit, each of said reaction chamber means being adapted to move in a predetermined path through said reaction station; and means for positioning each of said reaction chambers at said reaction station to receive reactants from said reactant supply means and to empty reaction products into said reaction product receiving means while the reaction chamber and reaction product receiving means are positioned at said reaction station and movable means for connecting said supply means to the chamber at said reaction station for the duration of the test to be performed.

2. A reactor apparatus comprising a single fixed reaction station having reactant supply means and reaction products receiving means; a plurality of reaction chambers having an upper opening adapted to receive reactants and lower opening through which reaction products exit, each of said reaction chamber means being adapted to move in a predetermined path through said reaction station; and mean for positioning each of said reaction chambers at said reaction station to receive reactants from said reactant supply means and to empty reaction products into said reaction product receiving means while the reaction chamber and reaction product receiving means are positioned at said reaction station and nozzle means mounted on said supply means and movable into sealing engagement with said chamber means.

3. A reactor apparatus comprising a single fixed reaction station having reactant supply means and reaction products receiving means; a plurality of reaction chambers having an upper opening adapted to receive reactants and a lower opening through which reaction products exit, each of said reaction chamber means being adapted to move in a predetermined path through said reaction station: and means for positioning each of said reaction chambers at said reaction station to receive reactants from said reactant supply means and to empty reaction products into said reaction product receiving means while the reaction chamber and reaction product receiving means are positioned at said reaction station and reaction product receiving means at said reaction station adapted to receive reaction products from the lower opening of said chamber means and nozzle means mounted on said reaction product receiving means movable into sealing engagement with said chamber means.

4. The apparatus according to claim 3 further comprising first nozzle means mounted on said supply means and movable into sealing engagement with said chamber means and second nozzle means mounted on said reaction product receiving means movable into sealing engagement with said chamber means upon movement of said first and second nozzle means into contact with said chamber means.

References Cited

UNITED STATES PATENTS

| | | | |
|---|---|---|---|
| 1,601,879 | 10/1926 | Opderbeck | 23—252 |
| 2,055,704 | 9/1936 | Pierce | 141—283 X |
| 2,304,398 | 12/1942 | Campbell | 23—288 X |
| 2,704,741 | 3/1955 | Thayer | 23—288 X |
| 3,081,158 | 3/1963 | Winfer | 23—253 |
| 3,187,486 | 6/1965 | Dinelli et al. | 55—197 X |
| 2,560,107 | 7/1951 | Hewson | 23—253 |
| 2,710,715 | 6/1955 | Gorham. | |

JOSEPH SCOVRONEK, Primary Examiner

U.S. Cl. X.R.

23—252, 253, 254; 55—197; 141—283

UNITED STATES PATENT OFFICE
CERTIFICATE OF CORRECTION

Patent No. 3,536,452     Dated   October 27, 1970

Inventor(s)   Charles J. Norton et al.

It is certified that error appears in the above-identified patent and that said Letters Patent are hereby corrected as shown below:

Column 2, line 43, "47 and secured" should read -- 47 are secured --; line 62, after "62 and" insert -- 63 of conduits 16 and 17, respectively. Terminals 62 and --; line 69, "about is pivot." should read -- about its pivot. --. Column 3, line 7, "further passes" should read -- further rotation passes --; line 38, "The eelctrical" should read -- The electrical --; line 57, "through tubes" should read -- through the tubes --. Column 4, line 66, "and mean for" should read -- and means for --.

Signed and sealed this 23rd day of February 1971.

(SEAL)
Attest:

EDWARD M. FLETCHER, JR.          WILLIAM E. SCHUYLER, JR.
Attesting Officer                Commissioner of Patents